United States Patent
Nolte et al.

[15] 3,691,642
[45] Sept. 19, 1972

[54] TRAILER AXLE ALIGNMENT GUAGE

[72] Inventors: William C. Nolte, Annapolis; Burtis M. Tyler, Fishing Creek, both of Md.

[73] Assignee: Fishing Creek Industries, Inc.

[22] Filed: July 6, 1970

[21] Appl. No.: 52,405

[52] U.S. Cl..................................33/193, 33/203.18
[51] Int. Cl...............................................G01b 3/14
[58] Field of Search....33/193, 203.17, 203.2, 203.18

[56] References Cited

UNITED STATES PATENTS

| | | |
|---|---|---|
| 3,137,076 | 6/1964 | Hurst..........................33/193 |
| 2,177,669 | 10/1939 | Martin....................33/203.17 |
| 2,590,722 | 3/1952 | Otis........................33/193 X |
| 2,845,718 | 8/1958 | Keymer.....................33/193 |

Primary Examiner—William D. Martin, Jr.
Attorney—Lavine, Cantor & Reich

[57] ABSTRACT

A trailer axle alignment guage has hook supports for hanging on a trailer axle, and a gauge detachably supported thereby including a bar for positioning across the trailer between the wheels and a base secured to the bar to be positioned along the trailer bed axis and carrying a lever system having vertical pivots and including an indicator and a connector for connection to the king pin: a measuring device is provided on the base to position it relative to the trailer bed axis.

13 Claims, 3 Drawing Figures

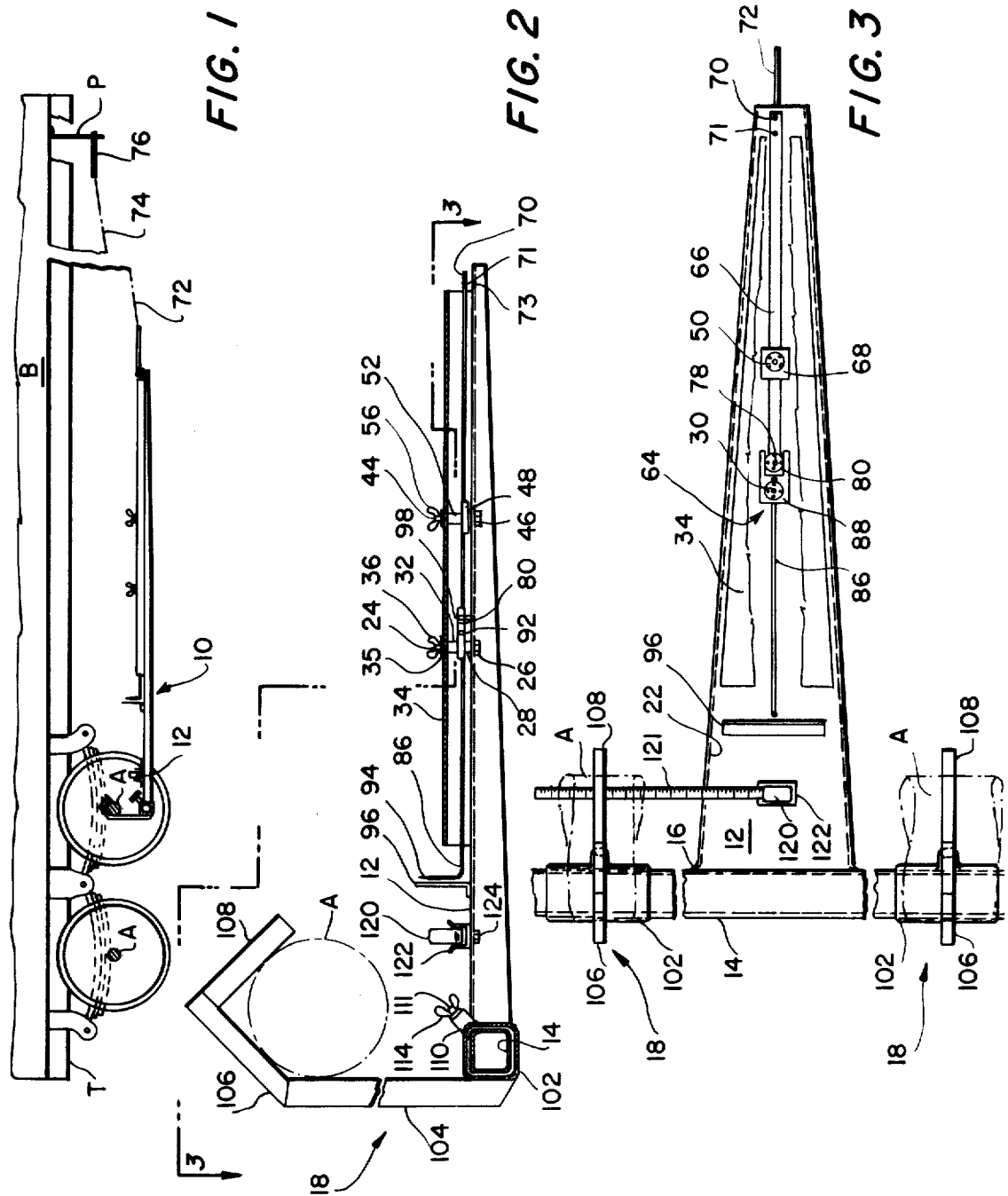

TRAILER AXLE ALIGNMENT GUAGE

BACKGROUND OF THE INVENTION

The present invention relates to an axle alignment guage for determining whether a trailer axle is in proper alignment, by which is meant whether it is perpendicular to the central axis of the trailer.

It has long been recognized that the axles of trailers may become mis-aligned after a period of use. It is believed that the reason for trailer axles becoming mis-aligned is related to the necessity for travel over rough roads and curbs, or the encountering of chuck holes, all of which serve to impose upon one or the other of the wheel assemblies of a particular trailer axle unduly heavy loads. Axle mis-alignment has long been known to significantly increase tire wear. In severe cases, driving is more burdensome, and there may also be a safety hazard because of the mis-alignment of a trailer axle.

The above matters are generally well known in the trucking industry, and therefore a number of proposals have been made of devices to detect and indicate mis-alignment of trailer axles.

In one known type of prior art device, a structure was provided which engaged the ends of the trailer axle, but this apparatus was large, bulky, heavy and expensive and therefore not acceptable.

Another proposal provided elements which attached to the ends of the axle and which, in effect, extended the length of the axle. A line, including a measuring device, was connected to the end of each attachment, and also to the king pin, and hence in order to determine if one leg of the triangle thus constructed was longer than the other leg, it was necessary to read and compare the two indicators in the two lines, thereby requiring the consumption of much time to attach the guage and to read it.

Other known types of axle alignment devices were those using optical systems: in one, a light projector was attached to the axle, and a light beam was caused to pass through a line dropped from the king pin; in another a telescope was attached to the trailer axle, and a sighting was made on the king pin, or on a line dropped from it. These optical devices, however, are not handled facilely by persons normally engaged in truck operation and maintenance, where ruggedness of construction and the ability to stand rough handling are necessary.

Still another proposal of the prior art required the permanent attachment by means of heavy and complex jig equipment, of guage attachment brackets to the axle of each trailer, and thereafter the attachment of a guage to these brackets. With such construction, it was necessary for a fleet owner to purchase the jig necessary to precisely position the brackets, and then to weld the brackets precisely as positioned on the axle, and thereafter to measure for axle mis-alignment with a separate guage In addition to the expense involved, there was always the risk in such construction that a bracket might be bent, thereby either obstructing the attachment of the guage or causing faulty reading.

Accordingly, among the objects of the present invention are the provision of a simple, rugged, light weight guage device readily adapted to the requirements of personnel employed by truck fleet owners. Another object of the present invention is to provide an axle alignment guage which may be used with existing trailers, without modification thereof or the provision of attachments thereto. Still another object of the present invention is to provide a trailer axle alignment guage which can be installed and read by one person. A further object of the present invention is the provision of a trailer axle alignment guage which can be used without special support installations for the trailer, and, specifically can be used while a trailer is parked on a reasonably level surface. Further objects of the present invention are to provide a trailer axle alignment guage which requires no power source, and yet which is reasonably sensitive so as to measure significant mis-alignment of a trailer axle. Other objects will become apparent from the following specification, the drawings, and the claims.

SUMMARY OF THE INVENTION

A trailer axle alignment guage is provided having two support hook structures which are hooked over and suspended from a trailer axle at spaced points therealong between the wheels. Each support hook includes a transverse tube at its lower end which will extend below and substantially parallel to the trailer axle. A guage is provided, including a bar that is releasably secured in the tubes of the support hooks. A base plate of the guage extends from the bar towards the king pin, and supports a lever system which is mounted on generally vertically directed pivitol axes. One end of the lever system has provision for connection to the king pin, as by a wire, and the other end of the lever system includes a pointer, there being provided a guage indicating plate adjacent the pointer. The pivotal axes of the lever system will lie in a plane substantially perpendicular to the trailer axle, and if this plane coincides with the central axis plane of the trailer bed, which may be taken as a vertical plane extending through the king pin and through the mid-point of the chassis, at its rear, then alignment of the trailer axle will be indicated by the pointer as related to the guage indicator plate. Positioning of the lever system axis is achieved by an extensible tape measure pivotally secured on the base plate at a plane through the lever system pivotal axes. A shield overlies and protects the lever system, and a lever and the base plate are each provided with a hole, the holes being in alignment when the lever system is in alignment.

BRIEF DESCRIPTION OF THE DRAWING

FIG. 1 is an elevational view, with right side wheels removed, of a trailer having the present axle alignment guage positioned thereon.

FIG. 2 is an elevational view, to an enlarged scale, of the trailer axle guage shown in FIG. 1, with parts in section.

FIG. 3 is a view taken on line 3—3 of FIG. 2, with parts broken away.

DESCRIPTION OF THE PREFERRED EMBODIMENT

Referring now to the drawings, wherein like or corresponding parts are designated with like or corresponding reference numerals throughout the several views, there is shown in FIG. 1 a trailer T of known construction, including a longitudinally extending body B having at the front end thereof a king pin P and adjacent the rear thereof axles A. While a wheel assembly is shown including two axles each having wheels at the ends thereof, it will be understood that the present invention guage is usable with both dual axle and single axle trailers.

Referring now to FIG. 2, there may be seen the trailer axle A with the trailer axle alignment guage 10 of the present invention in position thereon. Gauge 10 includes an elongate base plate 12 having attached to its rear or left end a bar 14. Preferably bar 14 is welded to the base plate 12, as at 16 (FIG. 3) and is a tubular member having a generally square cross section. The base plate 12 is elongated, and includes depending side flanges 22. Preferably, base plate 12 is in the form of a trapezoid, as clearly shown in FIG. 3.

A pivot pin 24 is supported in base plate 12, extending perpendicularly thereto. Pin 24 is secured to the base plate 12 by a pair of nuts 26, 28, an anti-friction bearing 30 being supported on the pin 24 above the nut 28. A spacer 32 is positioned over the bearing 30, and a shield 34 is over the spacer 32. The upper end of the pivot pin 24 is threaded, and receives a wing nut 36 for securing the shield 34 in position.

A second pivot 44 is supported on base plate 12 forwardly of pin 24, being provided at its lower end with a nut 46, with a spacer 48 positioned on the surface of the base plate 12. Above and supported by the spacer 48 is a radial bearing 50, and above that is a spacer element 52, upon which rests the shield 34. A thumb nut 56 is placed on the pivot pin 44, to thereby secure the shield 34 in position.

Referring now to FIG. 3, there may be seen a lever system generally designated 64 mounted on the base plate 12, the lever system 64 including a lever 66 supported intermediate its ends, specifically including a block 68 in which is mounted the bearing 50, the arms of the lever 66 being also secured to the block 68. At its forward end, the lever 66 has an aperture 70 in which is secured a wire 72. Wire 72 may include a spring 74 (FIG. 1), and at the end thereof opposite to the lever 66, it is provided with a suitable ring element or the like 76 for fastening it to the king pin P. Rearwardly of aperture 70 in lever 66 is an alignment aperture 71, which overlies an alignment aperture 73 (see FIG. 2) when the lever 66 is in proper alignment. A suitable pin or rod may be placed through apertures 71 and 73, to enable checking the alignment of the guage, and to lock the lever system against movement during storage and handling.

The rear end of lever 66, as shown in FIG. 2, is provided with a post 78, on which is positioned a bearing 80. A second lever 86 carries adjacent its forward end a block 88 having an aperture therein in which is mounted the bearing 30; block 88, at its forward end, is furcated to thereby engage the bearing 80. At its rear end, the lever 86 is provided with an upstanding portion 94 (see FIG. 2), immediately to the rear of which is an indicator plate 96 provided with suitable markings in the normal manner. Indicator plate 96 is supported on the base plate 12, and extends transversely of the center line of base plate 12; the center line of base plate 12 is a line which extends through the axes of the bearings 30 and 50 and the aperture 73, and is preferably along the center line of the base plate 12 as it is physically structured.

The shield 34 encloses between it and the base plate 12 the lever system 64, except for the front portion of lever 66 and the rear portion of lever 86, thereby protecting the bearings against dirt and the like, and protecting the parts of the lever system including their pivots, against damage due to the dropping of the guage plate on the ground, or of damage due to being struck by objects, or, in turn, the guage striking an object such as the parts of the trailer.

The bar 14 and the base plate 12 attached to it are detachably secured as a unit to supports 18, two of which may be seen in FIG. 3 spaced on the axle A. In FIG. 2, a support 18 is seen to include a transverse tube 102 having an upwardly extending bar 104 secured to the center thereof, bar 104 having at its upper end a pair of serially attached plates 106, 108, the latter being at 90 degrees to each other, and preferably at 45 degrees to the horizontal and vertical axes. Thus, the plates 106 and 108 form a suspension hook support for the tube 102 and plate 104 which is readily engagably with axles of various sizes, and of the known shapes thereof, specifically round and square in cross section. Each tube 102 has welded to it a threaded stud 110, which receives a bolt 112 having a head 114 with wings to permit actuation of bolt 112 to clamp or release the bar 14.

To position the base plate 12 so that its center line is substantially at the center of the bed of trailer T, a steel tape measuring device 120 of conventional construction is provided, mounted on the center line of base plate 12 rearwardly of indicator plate 96 by a spring clamp 122 pivotally fastened to base plate 12 by a pivot pin 124. The steel tape 121 is shown withdrawn from its case in FIG. 3, extending toward a wheel of the trailer T mounted on axle A.

In use, it will be understood that there are essentially three parts of the guage of the present invention, which are separately stored and handled, these being the two supports 18, and the base plate 12 which is secured to the bar 14. The supports 18 are positioned at spaced points along an axle A between the wheels, generally as shown in the drawings, with the trailer in position on a reasonably level supporting surface, such as a parking lot or the like. Then the bar 14 is passed through the tubes 102, the base plate 12 being positioned approximately on the center line of the bed of trailer T, and being supported by the bar 14 and supports 18. The steel tape 121 is then pulled from its housing, and the end thereof is placed against an interior surface of the trailer or of the interior surface of a wheel on the axle A. This distance is noted, and then a similar measurement is made to a corresponding surface on the other side of the trailer or on the other wheel. Lateral positioning of the base plate 12 is adjusted until these two measurements are substantially identical. When the measurements as determined by the steel tape 121 are substantially the same, the base plate 12 will be substantially on the center line of the bed of trailer T, and in particular the above noted center line of base plate 12. Lateral positioning of the base plate center line thus places it at the center line of the trailer bed whether or not the trailer axle center point is on the trailer bed center line. The ring element 76 is attached to the king pin P, as shown in FIG. 1, spring 74 permitting some automatic adjustment of the effective length of the wire 72. If the axle A is perpendicular to the trailer central axis, the pointer 94 will lie in opposition to the midpoint of the indicator plate 96. If, however, the axle A is mis-aligned, the lever system 64 will cause an indication of that condition to be given by the relationship of the pointer 94 to the indicator plate 96.

In order to check to see that no damage has been done to the lever system 64, a pin may be passed through the aperture 71, and if the pin also passes through the aperture 73, then it is established that the lever system 64 and therefore the guage are in proper alignment. Such a pin may be left in the apertures 71 and 73 to prevent motion of the lever system 64 during transportation and storage.

After use, merely by unloosning the clamping bolt 112 of each of the tubes 102, the three parts may be disassembled for use on another trailer, or for storage.

There has been provided a trailer axle alignment guage which is simple to install and use, and which is of rugged, light weight construction entirely suitable for use in connection with the maintenance of truck fleets. This alignment guage may be installed without delicate, complex or expensive equipment, and requires no expensive structural installation on which the trailer must be positioned. The guage of the present invention is readily disassembled for storage, and can be utilized by one person with facility. It is sufficiently accurate, and is protected against damage during use and storage.

It will be obvious to those skilled in the art that various changes may be made without departing from the spirit of the invention and therefore the invention is not limited to what is shown in the drawings and described in the specification but only as indicated in the appended claims.

We claim:
1. A trailer axle alignment guage comprising:
a. a base plate,
b. lever means, pivot means pivotally mounting said lever means on said base plate for movement generally parallel thereto,
c. indicating means on said base plate in juxtaposition with said lever means for indicating the position thereof,
d. means for supporting said base plate from a trailer axle for lateral adjustment along the axle to thereby enable said pivot means to be positioned at the trailer bed center line, comprising hook support means for engaging the trailer axle between the trailer wheels, and
e. means on said base plate for cooperation with measuring means for measuring the transverse distance between said base plate and the trailer bed.

2. The trailer axle alignment guage of claim 1, and means connecting said hook support means to said base plate.

3. The trailer axle alignment guage of claim 2, said connecting means comprising a transverse bar secured to said base plate, and means on said hook support means for detachably receiving said bar.

4. The trailer axel alignment guage of claim 3, said last mentioned means comprising a tubular element for receiving said bar therein.

5. The trailer axle alignment guage of claim 4, and releasable means on said tubular element for securing said bar therein.

6. The trailer axle alignment guage of claim 3, said hook support means comprising a pair of hook members.

7. The trailer axle alignment guage of claim 1, said last mentioned means comprising means for supporting measuring means, and measuring means supported thereby.

8. The trailer axle alignment guage of claim 7, and means pivotally connecting said supporting means to said base plate at the center line thereof for movement about an axis perpendicular to said base plate.

9. The trailer axle alignment guage of claim 8, said measuring means comprising flexible tape means.

10. The trailer axle alignment guage of claim 1, and shield means overlying said lever means.

11. The trailer axle alignment guage of claim 1, and means for determining the alignment of said lever means.

12. The trailer axle alignment guage of claim 11, said last mentioned means comprising apertures in said lever means and base plate.

13. The trailer axle alignment guage of claim 1, and extension means connected at one end to an end of said lever means and adopted to have the other end thereof connected to the king pin of a trailer.

* * * * *